United States Patent [19]

Callahan et al.

[11] Patent Number: 5,104,675

[45] Date of Patent: Apr. 14, 1992

[54] PRODUCT AND PROCESS OF MAKING A FIRM-TEXTURED MOZZARELLA/CHEDDAR PRODUCT

[75] Inventors: Kathleen C. Callahan, Northbrook; Virgil L. Metzger, Vernon Hills, both of Ill.

[73] Assignee: Kraft General Foods, Inc., Glenview, Ill.

[21] Appl. No.: 652,245

[22] Filed: Feb. 5, 1991

Related U.S. Application Data

[63] Continuation of Ser. No. 518,292, May 3, 1990, abandoned, which is a continuation of Ser. No. 365,913, Jun. 14, 1989, abandoned.

[51] Int. Cl.⁵ .............................................. A23C 19/14
[52] U.S. Cl. ................................................... 426/582
[58] Field of Search ........................................ 426/582

[56] References Cited

U.S. PATENT DOCUMENTS

| 4,112,131 | 9/1978 | Bosy et al. | 426/582 |
| 4,143,175 | 3/1979 | Whelan et al. | 426/582 |

*Primary Examiner*—Donald E. Czaja
*Assistant Examiner*—Helen Pratt
*Attorney, Agent, or Firm*—Fitch, Even, Tabin & Flannery

[57] ABSTRACT

Premium quality, rich melting mozzarella/cheddar cheese products such as hot-packed slices having a mozzarella-like firm texture and a cheddar flavor profile.

4 Claims, 5 Drawing Sheets

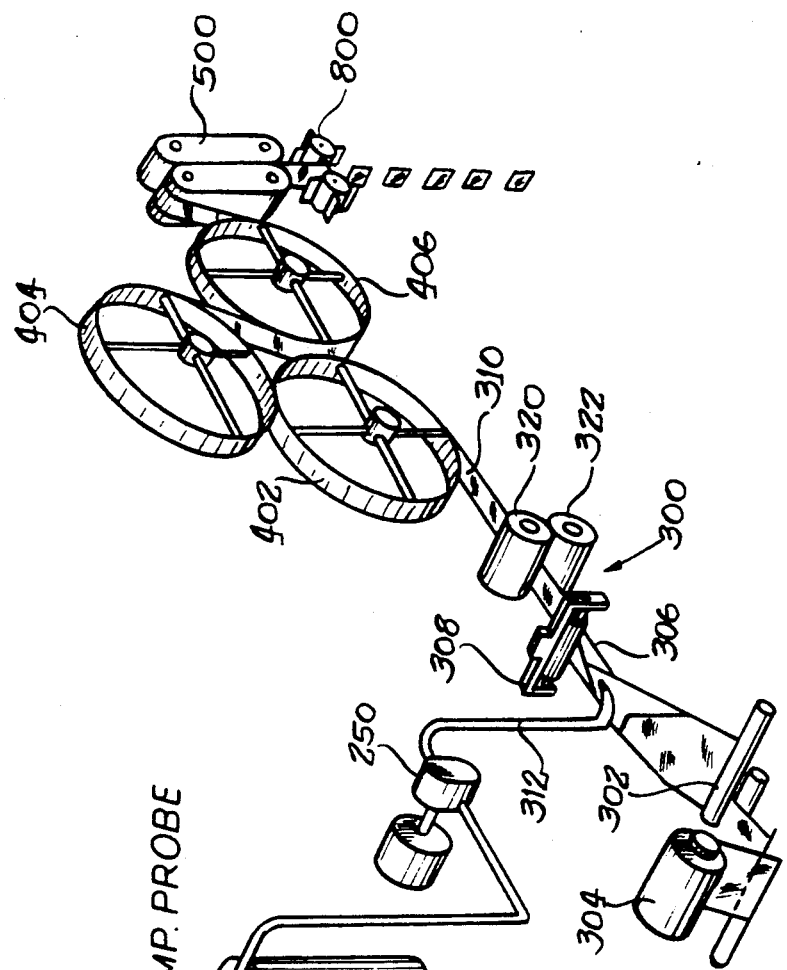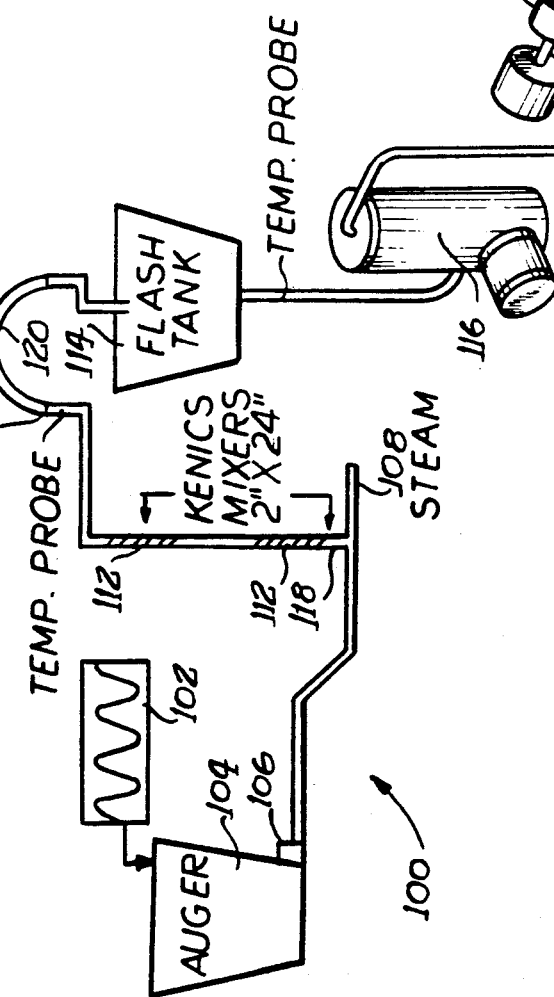

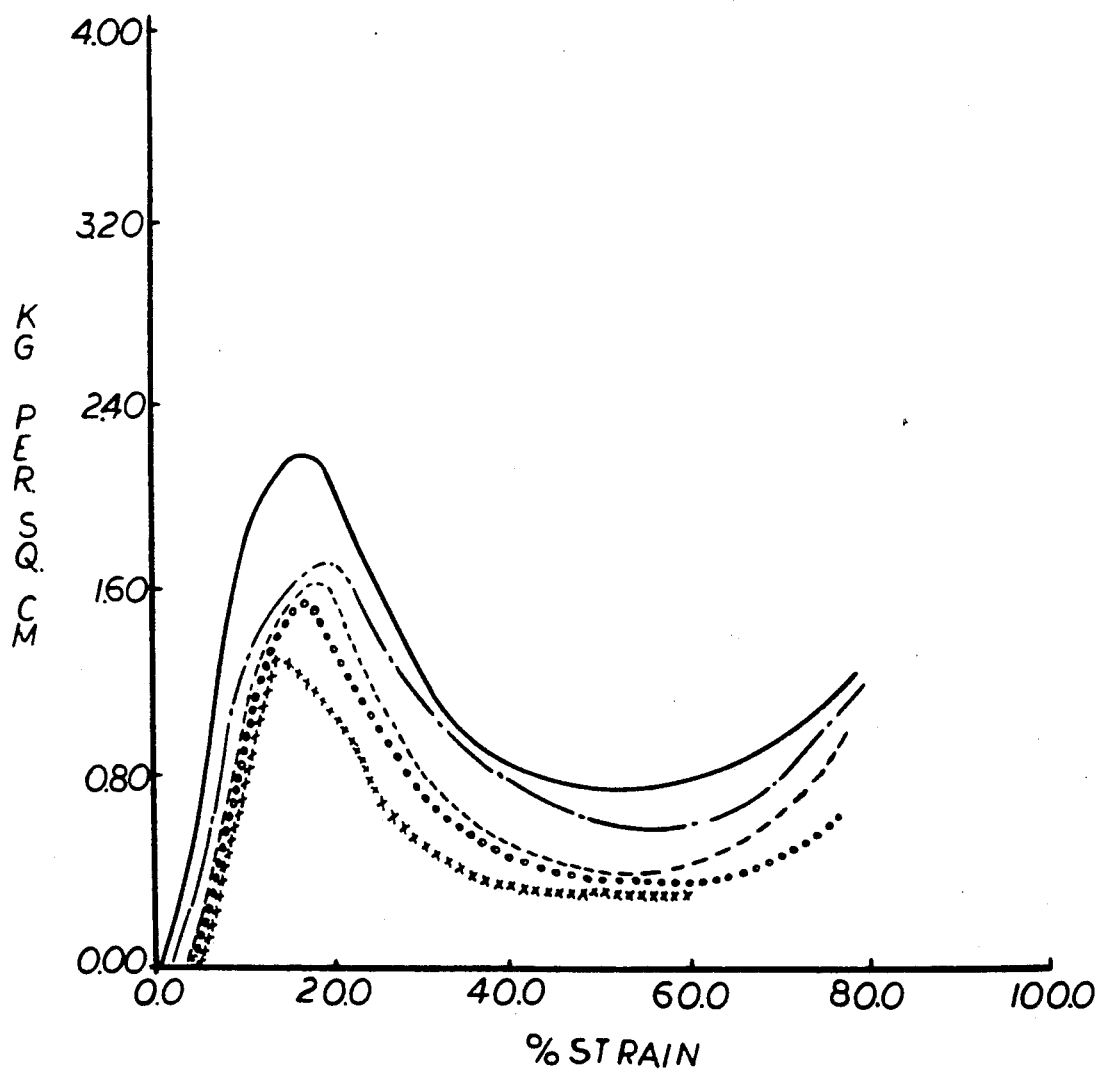

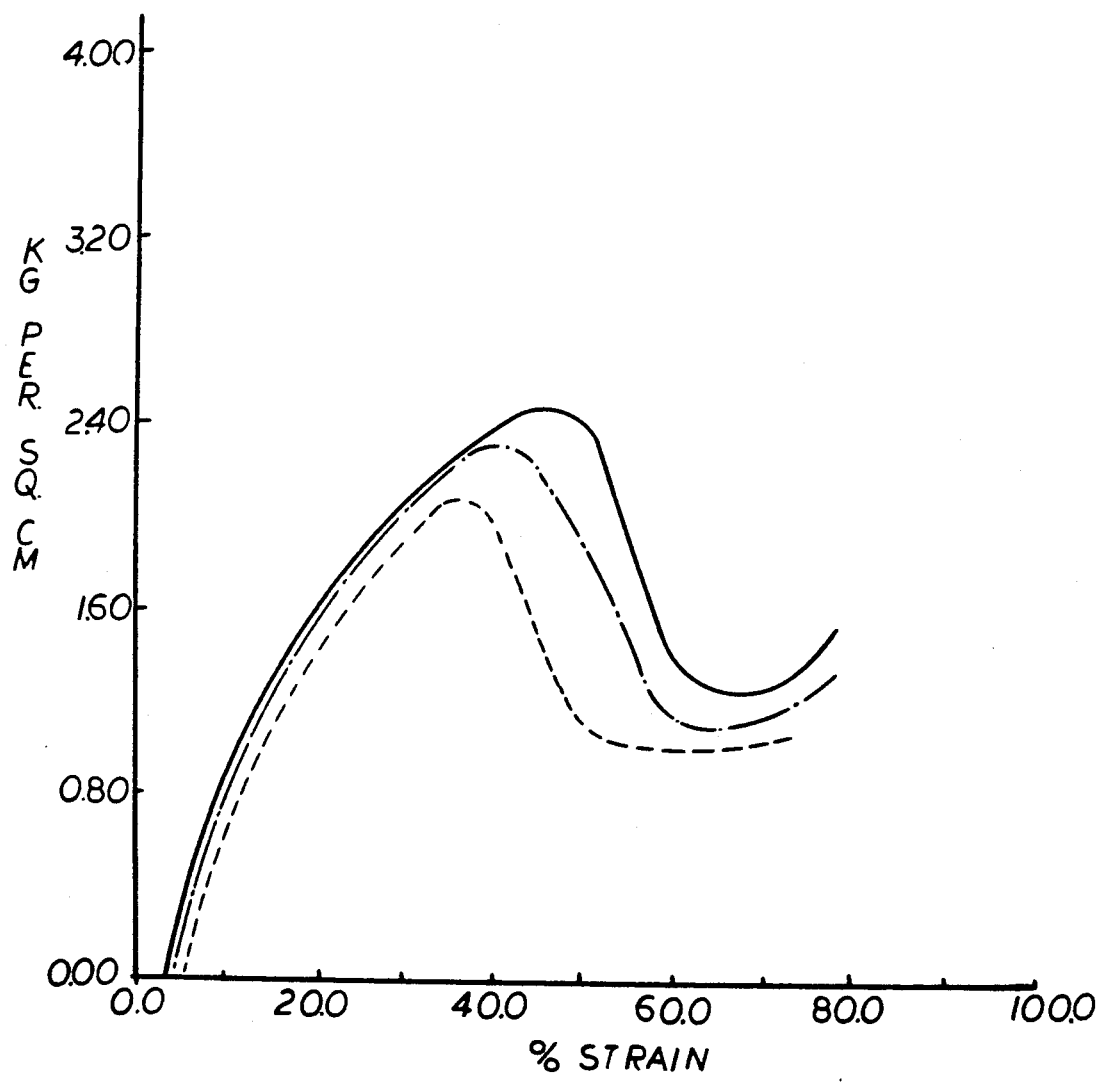

STRESS VS. % STRAIN

PRODUCT AND PROCESS OF MAKING A FIRM-TEXTURED MOZZARELLA/CHEDDAR PRODUCT

This application is a continuation, of application Ser. No. 518,292 filed May 3, 1990 abandoned which is a continuation of Ser. No. 365,913 filed June 14, 1989, abandoned.

The present invention is directed to cheese products, and, more particularly is directed to premium quality, processed cheese products with the flavor profile of a natural mild Cheddar and the stringy, firm textured functional body characteristics of a young mozzarella cheese.

BACKGROUND OF THE INVENTION

Process cheese products typically are prepared by forming a blend of one or more comminuted natural cheeses, together with various added additives such as whey or emulsifying salts. The processed cheese products are produced by heating, melting and mixing the cheese blend to form a homogeneous emulsified molten mass, followed by cooling and solidification of the molten mass. The heating, melting and homogenizing of the blend of cheese raw materials with emulsifying salts such as sodium phosphate and/or sodium citrate in amounts of 2-3 weight percent permits manufacture of soft-bodied, easily meltable process cheeses and process cheese foods. Heating of cheese in a cooker with relatively high levels of emulsifying salts to break the body of the natural cheese to make relatively soft-bodied process cheese products has been long known in the art. However, heating of the comminuted natural cheese without proper agitation, or insufficient amounts of emulsifying salts tends to result in separation of the fat, thus failing to provide a satisfactory emulsion.

Because of their molten, easily handled form, it is an advantage of process cheese products that they are readily packaged to provide convenient consumer products. Packaging may take any one of a number of forms, for example, hot packing in a plastic film tube which is cross-sealed and cut to provide individually wrapped slices. The molten process cheese product may also conventionally be formed into slices by distributing the product upon the surface of a cooled rotating chill roll in the form of a thin layer which solidifies into a sheet which is removed from the chilled surface of the roll, cut into strips and subsequently into slices followed by packaging of the sliced process cheese product.

It would be desirable to provide a flavorful cheddar cheese product which could be melted and readily packaged like process cheese, but which would have the stringy, firm body of a natural mozzarella cheese, which did not exhibit oil separation, and it is an object to provide such a cheese product. These and other objects will be apparent from the following detailed description and the accompanying drawings.

DESCRIPTION OF THE DRAWINGS

FIG. 1 is a schematic flow sheet depicting one embodiment of a method for the manufacture of firm textured mozzarella/cheddar process cheese products by an in-line method in accordance with the present invention;

FIG. 2 is a graphical representation of the stress vs. strain relationship, analyzed at 45° F., of an aged natural cheddar cheese suitable for use in the mozzarella/cheddar cheese product of the present invention;

FIG. 3 is a graphical representation of the stress vs. strain relationship, analyzed at 45° F., of a young mozzarella cheese suitable for use in the mozzarella/cheddar cheese product of the present invention;

DESCRIPTION OF THE INVENTION

Figure 4:
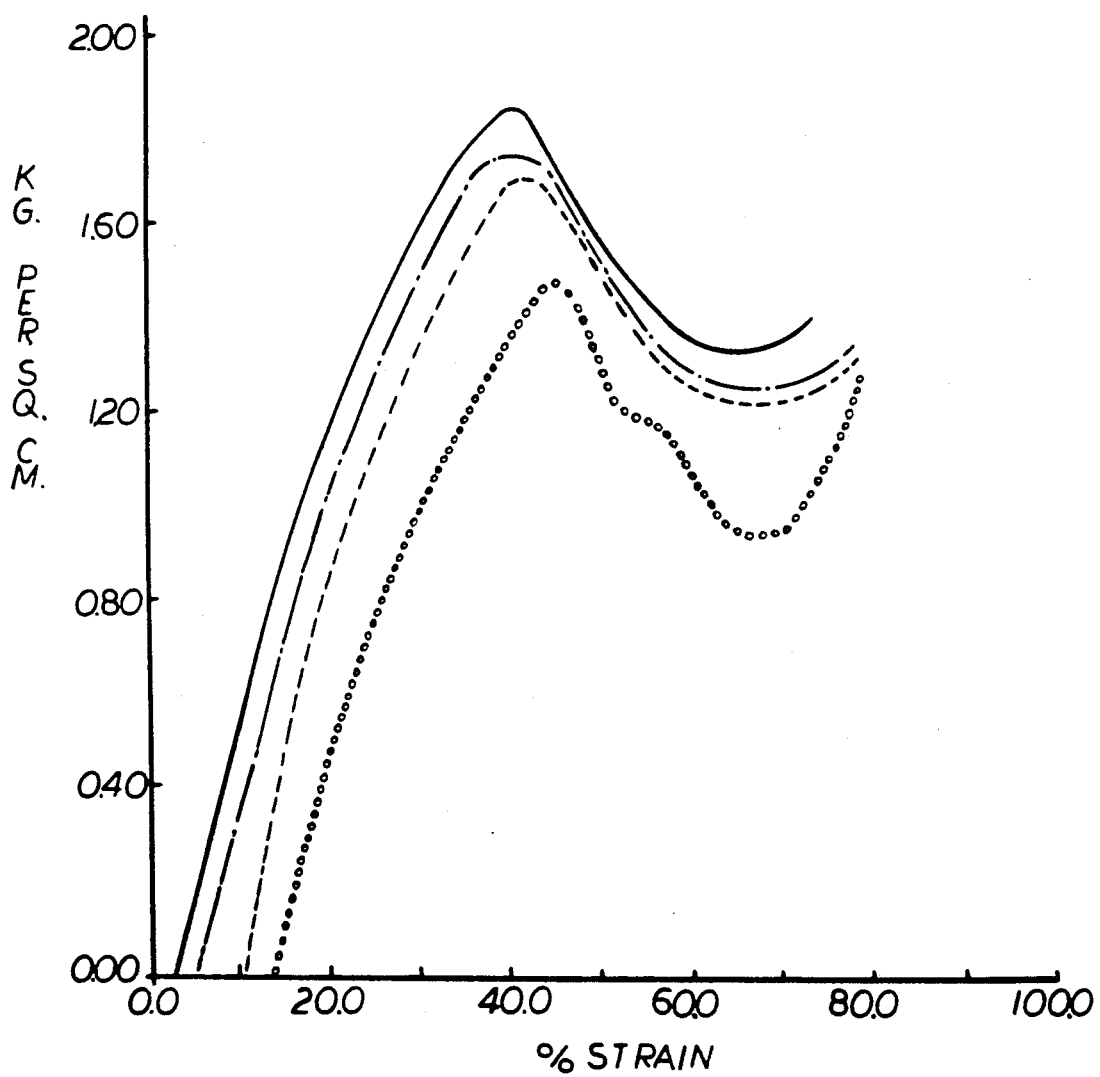
FIG. 4 is a graphical representation of the stress vs. strain relationship analyzed at 45° F. of a mozzarella/cheddar cheese product prepared in accordance with the present invention.

Generally, in accordance with the present invention, stringy and rich melting process cheese products are provided which have the flavor profile of a natural mild cheddar cheese and the firm textured functional body characteristics of a young mozzarella cheese. The products may be prepared on a continuous in-line basis by providing a uniform blend of specific types of natural mozzarella and cheddar cheeses with very limited amounts of sodium citrate into a pressurized cooking zone maintained at a pressure above atmospheric pressure.

The finished product has a cheddar flavor, a high degree of firmness and characteristic stretch properties upon heating and substantially no free fat or moisture.

An important component of the mozzarella/cheddar products of the present invention is a young natural mozzarella cheese. By young natural mozzarella cheese as used herein is meant a 14-21 day old low moisture part skim mozzarella which is bland in flavor and exhibits a live resilient body. The young mozzarella cheese component is necessary to provide the stretch characteristics with a linear knit texture in the finished product. An aged cheddar cheese component is also an important component of the product. By "aged" cheddar cheese as used herein is meant an aged cheddar cheese which has been aged for at least 90 days, and preferably from about 120 to about 150 days. This cheese should not have any off flavors. An enzyme modified cheese (flavorant) may be included in amounts not exceeding 3.5 weight percent of the total product weight, in substitution for the cheddar cheese component, as a flavoring agent. In addition, sodium citrate is included in the product in relatively small amounts of less than 0.7 weight percent of the finished product, and preferably from about 0.25 to about 0.6 weight percent on a total product solids basis. Salt may also be included, as well as conventional coloring agents.

After proper cheese selection is made, the cheese components are ground. The cheeses are blended in a ratio of from about 60 to about 75 weight percent and preferably from about 65 to about 70 weight percent natural mozzarella cheese to from about 25 to about 40 weight percent and preferably from about 30 to about 35 weight percent natural cheddar cheese. Using levels of natural young mozzarella cheese higher than 75 weight percent results in a very stiff product which is difficult to pump. At young mozzarella levels of less than about 65 weight percent, and particularly at levels less than 60 weight percent, the stretch characteristics of the finished product are unfavorably altered.

The mozzarella/cheddar product should have a minimum fat content of 36 weight percent and maximum moisture content of 48 weight percent. Salts and colors are then added to this blending procedure. Adequate blending of the mixture may be carried out in about 10 to 15 minutes.

Once proper blending is complete, the raw material may be subjected to steam injection cooking under specific high temperature, short time conditions. A preferred composition of the mozzarella/cheddar product has the following composition:

|  | (As Is) | (Solids) |
|---|---|---|
| 14-21 Day Old Mozzarella cheese | 64.7900 | 33.6900 |
| Aged Cheddar | 27.7700 | 18.0500 |
| Enzyme Modified Cheese | 3.4100 | 1.5000 |
| Sodium Citrate | 0.5700 | 0.5000 |
| Sodium Chloride | 0.2500 | 0.2500 |
| Sorbic Acid | 0.1800 | 0.1800 |
| Apo Carotenal #2 | 0.0300 | 0.0300 |
| Condensate/Moisture | 3.0000 | (45.800) |
|  | 100.0000 | 54.2000 |

Typical finished product parameters of the above embodiment are as listed below:

| Moisture | 48.0% maximum |
|---|---|
|  | 44.0-46.0% preferred |
| Fat | 36.0% FDB minimum |
|  | 22.0-23.0% preferred |
| pH | 5.30 ± 0.15 |
| Salt | 2.0 ± 0.20 weight percent |
| Sorbic Acid | <2000 ppm |
| Total Emulsifier Solids | 0.50% |

The blended components are subjected to steam injection cooking under certain specific conditions. As indicated, steam is injected directly into the blended cheese components in a confined region and is substantially condensed within the confined region thus heating and melting the raw material into a molten mass. The molten mass is subjected to shear due to the turbulence caused by introduction of the steam and the action in the confined region which results in partial emulsification and homogenization of the molten mass. Sufficient steam is introduced into the cheese blend to provide a molten mass, and generally sufficient steam is introduced to heat the molten mass to a temperature in the range of from about 190° F. to about 220° F. This cook temperature should be monitored carefully, to prevent loss of body and/or product stability. The condensation of the steam in the molten cheese mass also increases the moisture content of the mozzarella/cheddar blend, thus aiding in the cooking process. The molten cheese mass is delivered from the steam injection cooking zone to a mixing zone where the steam or moisture is mixed with the cheese and the temperature of the molten cheese mass is equilibrated. The molten cheese is delivered from the mixing zone to a cooling zone having a pressure lower than the pressure of the cooking zone. The molten cheese should be maintained at elevated temperature of 190°-220° F. for at least a length of time in the range of from about 25 to about 45 seconds and preferably from about 30 to about 40 seconds, and accordingly should be rapidly transported through the steam injection and mixing zone(s). As the molten cheese passes from the mixing zone to a cooling zone, flash expansion or cooling of the molten cheese takes place causing deaeration and vaporization of a portion of the moisture in the molten cheese. The amount of vaporization which takes place determines the final moisture and temperature of the finished cheese and is dependent on the absolute pressure in the cooling chamber.

Control of the final moisture and temperature of the process cheese product may be attained by controlling the absolute pressure in the cooling chamber. The amount of moisture removed, as vapor, from the cheese as it is cooled in the cooling chamber from its cooking temperature to the final cooling chamber discharge temperature, may be approximately equal to the amount of moisture added to the cheese as steam during the steam injection heating step.

Referring now to FIG. 1, there is illustrated a schematic flow diagram of a preferred embodiment of the disclosed invention. The product cheese components, which comprise from about 25 to about 35, and preferably from about 30 to about 35 parts by weight aged cheddar and from about 60 to about 75 and preferably from about 65 to about 70 parts by weight of young mozzarella cheese are comminuted in conventional cheese grinders (not shown). About 3.5 weight percent of an enzyme modified cheese flavor material is incorporated to enhance the cheese flavor of this product. A small amount of sodium citrate (solids basis) is mixed with the comminuted cheese in a blender which may be of a conventional type adapted to mix process cheese products, such as a ribbon blender, to provide 0.5 weight percent of sodium citrate in this blend. In FIG. 1, a single blender 102 is illustrated, but it is to be understood that any number of blenders may be utilized to provide a raw material in proper condition for cooking. In a preferred embodiment of the invention, at least two blenders are utilized which alternately feed raw material to the in-line cooking system of the invention.

The body of the young natural mozzarella cheese is of critical importance in attaining a finished product of the correct consistency. It must be firm with a live body of the type developed after 14 to 21 days of curing.

Rework cheese may be added at the blender in small amounts, not to exceed 5 percent by weight based on the total blend weight. Blending is carried out for 10-12 minutes or until even dispersion of raw materials free of unbound moisture or fat has been attained. A cook temperature of 190°-220° F. is used and is monitored so that it does not result in a broken emulsion or loss of body in the finished product. In the event of down time on the line, product held hot (i.e., at a temperature more than 155° F.) for longer than 15 minutes due to loss of body during that time cannot be used in the product. The product is to be stored and shipped at 45° F.

For example, a 4000 lb. cheese blend may be prepared as follows:

| Cheese | Lbs. |
|---|---|
| Aged natural Cheddar - full | 1200 |
| flavor - aged 120 days | (30%) |
| Young Mozzarella (14 day old) | 2800 |
| live meat-like body, bland flavor | (70%) |
| Total | 4000 |

Blender additions may consist of 0.5% by weight sodium citrate based on the total solids content (dry basis) (Pfizer) and 0.03% Apo-Carotenal (Roche #2) also on a solids basis. Agitation in the blender for 10-20 minutes provides sufficient mixing.

The blended raw material is delivered from the blender to an auger 104 to provide a positive supply of comminuted mozzarella and cheddar cheeses from the blender to a pump 106.

The feed pump may be of any design capable of pumping the material through conduit into a steam infusor which is operated at a pressure above atmospheric pressure. A preferred form of feed pump is a positive displacement pump utilizing lobe rotors. A check valve (not shown) may be provided in the conduit between the pump and the bayonette steam infusor 108 to prevent back flow of product from the infusor.

The steam infusor 108 receives steam from a suitable source through a line and a control valve (not shown).

A preferred design of the steam infusor is disclosed in detail in U.S. Pat. No. 4,112,131, which is incorporated herein by reference. The steam is injected into and condensed in the comminuted cheese in a region of confined turbulence in order to heat the cheese to form a molten mass and to effect partial mixing of the steam with the raw material. A temperature sensing device 110 is provided which may be utilized with a conventional control system to monitor the amount of steam through the control valve to maintain the temperature of the cooked product in the range of 190° F. to 220° F.

From the infusor 108 the molten mass is delivered through conduit 118 to a mixing zone which includes static mixer and a strainer in the conduit.

In order to prevent burn-on in the piping and to provide a short distance between the point of steam injection and flashing, the conduits are made relatively short (i.e., 20 feet) and the interior of the conduits are coated with polytetrafluoroethylene. Two 2"×24" long static (Kenics) mixers are located following in-line steam injection. After passing through the static mixers 112, the molten product runs through approximately 6 feet of stainless steel polytetrafluroethylene lined piping 120 to the flash tank 114, and from thereto a surge tank 116. The conduits are unobstructed by line strainers after the surge tank before packaging. A cook temperature not to exceed 220° F. (preferably 190° F.-210° F. is used, with a flash cool of approximately 155° F. not to exceed 165° F.).

The static mixers are fixed in-line mixers having no moving parts. A static mixer is a series of fixed, helical elements enclosed within a tubular housing. The static mixer is utilized to finish mixing the steam with the molten mass. The strainer plate or plates are used to prevent undesired lumps of material from the infusor from proceeding through the process.

The molten mass is then passed through a pressure controlled valve into a flash cooling tank 114 maintained at a pressure lower than the pressure in the steam infusor and conduit. The cooling tank is desirably under vacuum and is connected by a conduit to a condenser which functions in providing a vacuum for the cooling tank. The vacuum is maintained at the desired level by means of a vacuum control circuit which may be of conventional design and includes a sensor and a vacuum controller which controls a valve in the vacuum line.

When the molten mass is delivered through the valve into the flash cooling tank 114 at a lower pressure, preferably a vacuum, the rapid reduction in pressure causes deaeration of the molten mass and also causes a portion of the water contained in the molten mass to be vaporized, thereby reducing the temperature of the molten mass.

The molten mass is collected at the bottom of the cooling tank, which is desirably conically shaped. The molten mass is discharged to a product discharge pump and a surge tank 116 which serves as a temporary storage vessel for continuous processing. The cooling tank may be provided with an agitator or auger (not shown) to facilitate discharge of the molten cheese mass. The pump, which may be of conventional design and may be generally similar to the input pump, provides for discharge of the process cheese product through conduit to a suitable station for packaging.

In the illustrated embodiment 100, the viscous molten cheese mass at a temperature of 155°-165° F. is delivered to the hot pack slice equipment. A fill temperature of approximately 155° F. is optimum. The product can be filled into conventional single slice innerwrap and overwrap packaging systems such as described in U.S. Pat. No. 4,586,317 which is incorporated by reference herein. A metallized overwrap is superior as a light barrier for providing extended shelf life.

In the hot pack single-slice packaging apparatus, the molten cheese product is discharged under positive pressure to a positive metering pump 250. The metering pump 250 is adapted to discharge the molten cheese product at a precisely controlled rate to an extruding nozzle of the film forming station 300. The positive metering pump 250 may desirably be varied in its pumped output under automatic or operator control in conjunction with the operation of the extruding nozzle and film forming station 300. In this regard, controller 270 may function to sense and coordinate the operation of the various components of the system.

The extruding nozzle and film forming station 300 comprises a film dispensing apparatus 302 for a continuous roll of transparent or semi-transparent, heat sealable wrapping material 304. The wrapping material is continuously formed into a tube 306 which may be overlapped (or longitudinally sealed) to form a continuous film tube of substantially constant diameter.

The molten cheese product is discharged into the film tube by means of extrusion nozzle 312. The rate of introduction of the molten cheese product into the film tube is coordinated with the forward motion of the film tube to provide steady state operation of the system. Sizing rolls 320, 322 may be provided to flatten the longitudinally sealed film tube and enclosed heat settable molten cheese product to a desired product thickness, which will generally be in the range of from about 1/16 to about 3/16 in the illustrated embodiment. A "bead" of the molten cheese product may be maintained ahead of the rollers 320, 322 to insure the uniform filing of the tube. Sterile air, nitrogen or carbon dioxide may also be introduced into the extrusion zone upstream (toward the roll 304) of the point of introduction of the molten cheese product) if desired, in order to maintain a countercurrent packaging atmosphere.

The flattened film tube 310 which is substantially filled throughout its cross section with the viscous, deaerated molten cheese product, is pulled through the film forming station 300 by means of a plurality of at least two film pulling wheels 402, 404, 406 of film pulling and cooling station 400. The wheels 402-406 are relatively large, and are intended to provide extended contact for uniform heat conduction to cool the cheese slices to a temperature of 55°-75° F. The cooling wheels 402-406 may desirably be cooled to a temperature in the range of from about 40° F. to about 60° F. by means of refrigerant circulated within the wheel structure. The cooled, wrapped cheese product may be conducted to sealing apparatus such as described in U.S. Pat. No. 4,586,317 of the present assignee, which is incorporated herein by reference comprising two opposing arrays of sealing elements and voiding elements, respectively arranged and interconnected in the form of belts which may be driven in registration at relatively high speed.

The wheels may be cooled by a continuously circulating coolant which is pumped through the wheel structure. At about 70° F. or less, the slices are more easily stacked and overwrapped by packaging equipment, and accordingly, it is desirable to cool the packages to such lower temperatures on the cooling wheels, or by subsequent cooling.

The cooled slices are subsequently conducted to a transverse cutting and packaging station 800 which may be of conventional design in which the film tube slices are transversely cut at approximately the center of the cross seals to provide individual packages. The entire apparatus and its corresponding cutting station may be operated continuously at relatively high speed to provide flat, undistorted individually wrapped slices with package cross seals of desirable uniform strength and integrity and having excellent bacteriological stability.

The individual slice packages may be stacked in layers of from about 3 to about 25 or more slices, and overwrapped with a suitable, preferably substantially gas impermeable, substantially light impermeable, packaging material such as an aluminum or aluminized packaging material, which forms a substantially hermetically sealed package around the individual slices such as described in U.S. Pat. No. 4,792,457 which is incorporated herein by reference. Such overwrap packaging may be carried out in accordance with conventional packaging practice, there being a wide variety of packaging methods and materials which are suitable for carrying out such overwrap packaging. The sealed, over-wrapped package provides the consumer with a sealed unit containing a plurality of individually wrapped slices which are not removed from the time of pasteurization until needed by the consumer.

Firm textured mozzarella/cheddar cheese slices in accordance with the present invention have been performance tested at beginning, middle and end of shelf life of at least 7 months. Tests used for evaluation were open face melt, grilled cheese and casserole functionality tests. At the beginning, middle and end of shelf life the results showed good cling to the macaroni and no oiling off in a casserole application; moderate soak in the bread and good spread characteristics in an open face melt; and good meltability and stretch characteristics as well as moderate soak into the bread in a grilled cheese sandwich. No oiling off, stretch deterioration or browning was detectable.

Samples submitted for microbiological testing throughout shelf life had acceptable results. Yeast, mold, coliform and E4 coli were all less than 10 colonies per gram. Total counts remained at less than 10 colonies per gram at 45° F. through shelf life and Salmonella was negative per 25 gram sample.

Light studies were conducted to measure the degree of light catalyzed oxidation under 125±25 candle foot power lights. A pink color and oxidized flavor developed after 3 days under the lights with clear overwrap. Metallized overwrap showed substantially superior preservative effect, with no oxidation noted until day 13 of testing under these powerful lights.

As discussed, the mozzarella/cheddar cheese product of the present invention has a firm texture, rich melting, stringy functional characteristics of mozzarella cheese, which is not typically characteristic of processed cheese, together with a cheddar flavor profile. In this regard, illustrated in FIGS. 2-5 are texture profile studies of a young natural mozzarella cheese component, an aged natural cheddar cheese component, a mozzarella/cheddar product in accordance with the present invention, and a conventional single-slice process cheese food product having a conventional emulsifying salt content. The single-slice product includes about 70% by weight of a bodying cheese which is "short and tough"; this body cheese is held for only about 1 week and has a body similar to that of the mozzarella used in the mozzarella/cheddar product. However, despite the similarities, the single-slice product has an entirely different and softer texture than the mozzarella/cheddar product. It is believed that this is primarily due to the single-slice emulsification system, which is not used in the mozzarella/cheddar product.

The fat content of the single-slice product is also similar to that of the mozzarella/cheddar product. However, because only a limited amount of sodium citrate is used in the mozzarella/cheddar product, and a different approach is used to bind the oil, the texture of the mozzarella/cheddar product is stringy and entirely different from that of the single-slice product.

As shown in FIGS. 2-5, the stress versus percent strain properties of the various cheese products are measured in compression by means of an Instron testing apparatus generally in accordance with the procedure described by Bourne in "Texture Profile Analysis", *Food Technology*, July, 1978, p. 62, et seq. In the testing, which is carried out at a test temperature of about 45° F., the cylindrical samples of the cheese are compressed at a constant velocity of 100 mm/minute by an Instron Universal Testing Machine, Model 1122 (manufactured by the Instron Corporation, Canton, Mass.) to a thickness of 5 mm. Measurement of the force in kilograms versus the deformation distance shown as percent strain, are charted as shown in FIGS. 2-5. The force is mathematically normalized to the expanding (with compression) area of the cheese cylinder by assuming a cylindrical shape for the compressed cheese cylinder (which during the actual run may have a truncated cone shape, rather than a cylindrical shape) to determine a normalized force per unit area value.

Figure 5:
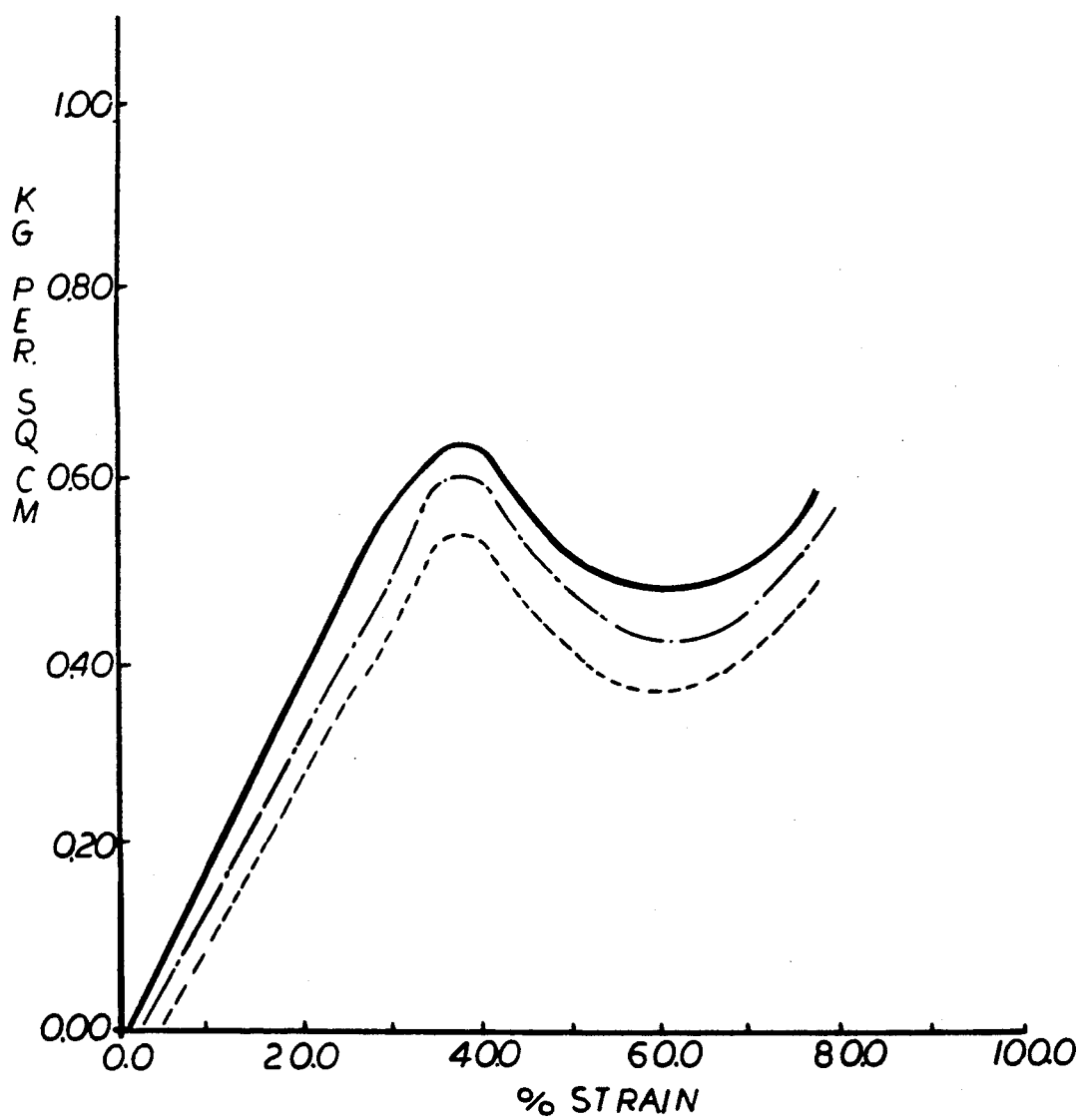
FIG. 5 is a graphical representation of the stress vs. strain relationship, analyzed at 45° F., of a conventional processed cheese food product containing 2-3 weight percent of emulsifier salts (solids basis) and having a relatively soft body.

As shown in FIG. 2, an aged natural cheddar cheese withstands a maximum force at about 20 percent strain. As shown in FIG. 3, however, a young natural mozzarella withstands a relatively high maximum force at a percent strain of 40-50 percent. Similarly, as shown in FIG. 4, an embodiment of a mozzarella/cheddar cheese product in accordance with the present invention withstands a relatively high maximum force in the range of about 1.4 to about 1.9 kilograms per square centimeter at a percent strain of about 40-50 percent, similar to that of the young, natural mozzarella component. However, as shown in FIG. 5, the conventional processed cheese food product having a relatively high emulsifier salt content can only withstand a relatively low maximum force in the range of about 0.5 to about 0.7 kilograms per square centimeter at a percent strain of 35-40 percent. This indicates the typical weak body of process cheese products.

Accordingly, it will be appreciated that a premium quality cheese product having a firm textured body, stringy melt characteristics and a cheddar cheese flavor profile has been produced in accordance with the present invention.

While the present invention has been particularly described with respect to a particular embodiment, it will be appreciated that various modifications and adaptations may be made based on the present disclosure and which are intended to be within the spirit and scope of the present invention as set forth in the following claims.

What is claimed is:

1. A method for continuous in-line manufacture of process cheese consisting essentially of the steps of blending from about 60 to about 75 weight percent of substantially young natural mozzarella cheese, from about 20 to about 35 weight percent of aged cheddar, and from about 0.25 to about 0.6 weight percent of sodium citrate on a total solids basis to provide a mix, conveying said mix under pressure first through a steam injection heating and mixing zone to provide a homogeneous molten cheese mass under pressure in said zone at a temperature of from about 190° F. to about 220° F. for a time of from about 25 to about 45 seconds and transferring said molten cheese mass from said mixing zone into a chamber maintained at a pressure lower than the pressure of said molten cheese mass in said mixing zone so as to cool said molten cheese mass to a temperature of from about 155° F. to about 165° F., forming said partially cooled molten cheese mass into slice form and cooling said slice form to provide a cheese product slice having a maximum moisture content of 48 weight percent, a minimum fat content of 36 weight percent, a firm, stringy texture and a cheddar flavor, and having a maximum compressive strength of at least about 1.4 kilograms per square centimeter at a percent strain of at least about 35 percent, which is substantially free of free fat and moisture, and which has a stringy, rich melt characteristic.

2. A method in accordance with claim 1 wherein said molten cheese mass consisting essentially of from about 65 to about 70 weight percent of young mozzarella, from about 30 to about 35 weight percent of aged cheddar, from about 3 to about 3.5 weight percent of enzyme modified cheese flavorant, and about 0.5 weight percent of sodium citrate, and wherein said molten mass is maintained in said zone for about 30 seconds.

3. A mozzarella/cheddar cheese product having a mozzarella-like firm texture and cheddar flavor profile consisting essentially of a uniform blend from about 60 to about 75 weight percent of a young natural mozzarella cheese, from about 25 to about 35 weight percent of an aged cheddar cheese, and from about 0.25 to about 0.6 weight percent of sodium citrate and having a maximum moisture content of 48 weight percent, a minimum fat content of 36 weight percent, a firm, stringy texture and a maximum compressive strength of at least about 1.4 kilograms per square centimeter at a percent strain of at least about 35 percent, which is substantially free of free fat and moisture, and which has a stringy, rich melt characteristic.

4. A cheese product in accordance with claim 3 wherein said molten cheese mass consisting essentially of from about 65 to about 70 weight percent of young mozzarella, from about 30 to about 35 weight percent of aged cheddar, from about 3 to about 3.5 weight percent of enzyme modified cheese flavorant, and about 0.5 weight percent of sodium citrate.

* * * * *